Patented Nov. 16, 1937

2,099,486

UNITED STATES PATENT OFFICE 2,099,486

SYNTHETIC RESIN AND METHOD OF PRODUCING

Irvin W. Humphrey, Wilmington, Del., assignor to Hercules Powder Company, Wilmington, Del., a corporation of Delaware No Drawing. Application January 29, 1935, Serial No. 3,945

18 Claims. (Cl. 260—8)

This invention relates to a new composition of matter and method of producing and more particularly relates to a new class of resinous esters produced in accordance with this invention by the esterification of acidic resins formed from certain terpenes and maleic anhydride.

The esters embodying this invention are in general slightly yellow in color and may vary from viscous liquids to hard resinous solids depending on the alcohol employed. They have desirable characteristics such as light resistance and durability to a high degree and are adaptable for various uses. Thus, for example, the esters embodying this invention will be found to be soluble in various solvents, to be of desirable color, and to resist discoloration and weathering. Further, for example, the esters lend themselves to use as plasticizers or resins in nitrocellulose lacquers, the liquid esters in general having a distinct solvent power on nitrocellulose.

The resinous esters embodying this invention may be produced by the esterification of an acidic resin formed by the reaction of dipentene, or equivalently either of its optical isomers d- and l-limonene, with maleic anhydride, or equivalently maleic acid, in the presence of heat, for example, as disclosed in my application for United States patent, Serial No. 756,703, filed December 8, 1934.

The acidic resins may be prepared, as is more fully disclosed in the application above referred to, by heating dipentene, or equivalently its optical isomers d- and l-limonene, with maleic anhydride. The reaction may be effected in any suitable manner, but will preferably be carried out by refluxing the dipentene with the maleic anhydride. It is desirable to use an excess of dipentene, which can be recovered unchanged by distillation upon completion of the reaction.

The esters may be acid or neutral and may be prepared, and their preparation is contemplated, by various processes, as under atmospheric or other pressure, with and without the use of an esterification catalyst, etc. Further, the esters may be prepared with the use of various monohydric or polyhydric alcohols, aliphatic monohydric alcohols such as methyl, ethyl, butyl, n-propyl, isopropyl, bornyl, isobutyl, amyl, fenchyl, abietyl, etc. alcohols, substituted aliphatic alcohols, such as benzyl alcohol, ethylene chlorohydrin, etc., polyhydric alcohols, such as ethylene glycol, propylene glycol, glycerol, pentaerythrite, etc., and substituted polyhydric alcohols such as glycerol monochlorohydrin, glyceryl monoethyl ether, glyceryl monophenyl ether, etc., are all contemplated within this invention. Mixtures of alcohols may also be used.

If desired, in the production of the ester, an esterification catalyst may be employed and as such may be used, for example, sulphuric acid, dry hydrogen chloride, metallic zinc or tin, paratoluene sulphonic acid, etc., and the esterification may be effected under atmospheric or other pressure. Where low-boiling alcohols are used, superatmospheric pressure is especially desirable.

As illustrative of the practical production of esters in accordance with this invention, using a monohydric alcohol, for example, the ester diethyl-dipentene-maleate may be prepared by mixing say one mole, say 234 g. of dipentene-maleic anhydride with an excess of say ethyl alcohol, say 368 g. and adding as an esterification catalyst about 8% by weight or about 50 g. of concentrated sulphuric acid. The mixture, of a light yellow color, is then kept at a gentle reflux, for say about 48 hours by, for example, heating at a temperature of about 100° C.

On completion of the heating period the resultant liquid is washed with water to remove the excess alcohol and sulphuric acid and then given an alkali wash, say with sodium carbonate solution, to remove any traces of sulphuric acid and any acid ester present. The product is then given a final water wash and the ester, which is a viscous liquid, is then dried say with anhydrous potassium carbonate.

If it is desired to further purify the ester, it may be distilled under reduced pressure, a part distilling at 195° C.–210° C. under a pressure of 15 mm. mercury. The residue which does not distill consists of the ester of the polymerized anhydride. Alternatively, the ester may be refined by heating to a temperature of about 150° C. and passing in air or some inert gas.

As further illustrating the production of the ester embodying this invention, for example, for the preparation of the ester dibutyl dipentene-maleate, say 234 g. of dipentene-maleic anhydride and 296 g. of butyl alcohol are mixed together, that is 4 mols of butyl alcohol for each mol. of anhydride, and then heated for say 7 hours at a temperature of say 117° C., the boiling point of butyl alcohol. The reaction will result in the formation of mono-butyl dipentene-maleate, which will be found to be a pale yellow, soft solid, which will remain dissolved in the excess alcohol. About 8% by weight of concentrated sulphuric acid is then added and the mixture is heated for approximately 40 hours at the same temperature, about 117° C. The result of the reaction will be the formation of dibutyl dipentene maleate.

On completion of the heating period the reaction mixture is washed with water to remove the sulphuric acid. The excess butyl alcohol is then removed by distillation. If desired, the ester may be distilled under reduced pressure for its purification or may be purified by air blowing at a temperature of approximately 150° C. It will be noted that volatile dibutyl dipentene-maleate distills at about 210° C.–230° C. under a pressure of 15 mm. mercury. The ester will be found to be slightly yellow in color and rather viscous. The residue remaining after the distillation of the volatile ester consists of the ester of the polymerized anhydride.

As illustrative of the practical adaptation of this invention, when a polyhydric alcohol for the esterification is employed a simple ester does not result. Polymerization takes place and the type of product formed is directly dependent on the alcohol employed as well as the temperature at which combination is allowed to take place. Thus, for example, when a dihydric alcohol is used, such as ethylene glycol, a hard resinous solid which is soluble in lacquer solvents results. When a polyhydric alcohol having more than two hydroxyl groups is used, on the other hand, the esterification if carried sufficiently far will lead to the formation of an insoluble gel. To avoid gelation it is necessary to employ an excess of the polyhydric alcohol or to interrupt the reaction just as gelation is about to commence.

As illustrative of the practical adaptation of this invention with use of, for example, a dihydric alcohol, the esterification may be carried out with, for example, ethylene glycol as follows. Thus, for example, 270 parts by weight of dipentene-maleic anhydride and 80 parts of ethylene glycol are heated together with good agitation at a temperature of 205° C.–215° C. for approximately 8 hours. Excess glycol may be removed by applying reduced pressure. As a result of this treatment a hard, pale yellow resinous solid is formed. It will be found to have an acid number of about 45 and a drop melting point of 95° C. to 100° C. It is soluble in organic solvents such as acetone, toluol, butyl acetate, etc., but is insoluble in alcohols.

Further, when a polyhydric alcohol such as glycerol, having three hydroxyl groups, is employed in the esterification, the esterification may be carried out in the following manner: Thus, for example, 300 parts by weight of dipentene-maleic anhydride and 100 parts by weight of glycerol are heated together with agitation at a temperature of 190° C.–200° C. for 8 to 10 hours. After this heating the product is a pale yellow, hard and brittle resin having an acid number of about 75 and a drop melting point of 95° C. to 100° C. By continuing the heating, preferably in a thin layer, an insoluble and infusible product may be produced. Such a product is useful as a molding material.

The following example illustrates the method of carrying out the esterification with a substituted polyhydric alcohol, for example, one having the hydrogen of at least one hydroxyl group replaced by an alkyl or aryl radical to form an ether. Thus, for example, 23 parts by weight of dipentene-maleic anhydride and 13 parts of glycerol monoethyl ether are heated together at a temperature of 220° C.–230° C. for approximately 20 hours. The resulting product is a light yellow, soft resin, soluble in lacquer solvents and having an acid number of about 60 and a drop melting point of 60° C.

The use of mixtures of more than one alcohol for the esterification is also contemplated. Thus, for example, a monohydric alcohol such as butyl alcohol and a polyhydric alcohol such as glycerol may be used in combination to give mixed esters. The combination in such a case may be carried out in any manner such as partial esterification first with butyl alcohol then completion of the esterification with glycerol, or vice versa.

It will be understood that the esters in accordance with this invention may be prepared by various methods other than those specifically outlined above. For example, the production of the esters may be effected at temperatures within the range of about 75° C. to 250° C. and the pressure may vary from atmospheric to about 300 pounds per square inch. The period required for esterification will, of course, depend upon the temperature and pressure employed.

It will be understood that in accordance with this invention substituted monohydric and substituted polyhydric alcohols are contemplated as included as equivalents within the terms "monohydric" and "polyhydric" alcohols as used in the claims appended hereto.

It will be understood that the esters in accordance with this invention will be found to possess various desirable characteristics and to be adaptable for various uses, such, for example, as an ingredient in lacquers, varnishes, and the like, together with the various well known ingredients thereof, as solvents, nitrocellulose, drying oils, plasticizers, gums, resins, etc., and will be found especially adaptable for use as a plasticizer in connection with nitrocellulose lacquers in view of its excellent plasticizing properties and its properties as a solvent for nitrocellulose.

It will be understood that the resinous esters from polyhydric alcohols in accordance with this invention may be modified during their production by the inclusion in the reaction mixture of various modifying agents, such as, rosin and other natural resins; animal or vegetable oils, especially the drying oils, for example, linseed oil, China-wood oil, etc.; organic acids, for example, oleic acid, linoleic acid, stearic acid, succinic acid, or its homologues, acids derived from China-wood oil, etc. Such modified resins are especially adaptable for use in lacquers, varnishes, plastics, etc.

I have not specifically claimed herein my invention as it relates to modified resins and their production, since such are the subject matter of and are claimed in my copending application, Serial No. 3,946, filed Jan. 29, 1935.

This application is a continuation in part of the application filed by me December 8, 1934, Serial No. 756,703.

What I claim and desire to protect by Letters Patent is:

1. A reaction product of dipentene-maleic anhydride and an alcohol.
2. A reaction product of dipentene-maleic anhydride and an aliphatic alcohol.
3. A reaction product of dipentene-maleic anhydride and a polyhydric alcohol.
4. A reaction product of dipentene-maleic anhydride and a monohydric alcohol.
5. A reaction product of dipentene-maleic anhydride and ethyl alcohol.

6. A reaction product of dipentene-maleic anhydride and glycerol.

7. A reaction product of dipentene-maleic anhydride and an aliphatic glycol.

8. The method of producing a resinous material which includes reacting dipentene-maleic anhydride with an alcohol.

9. A coating composition comprising a reaction product of an alcohol and dipentene-maleic anhydride, and a solvent.

10. A coating composition comprising a reaction product of an alcohol and dipentene-maleic anhydride, a non-volatile lacquer ingredient and a solvent.

11. The method of producing a resinous material which includes reacting dipentene-maleic anhydride with a polyhydric alcohol.

12. The method of producing a resinous material which includes reacting dipentene-maleic anhydride with glycerol.

13. The method of producing a resinous material which includes reacting dipentene-maleic anhydride with an aliphatic glycol.

14. The method of producing a resinous material which includes reacting dipentene-maleic anhydride with ethylene glycol.

15. The method of producing a resinous material which includes reacting dipentene-maleic anhydride with a monohydric alcohol.

16. The method of producing a resinous material which includes reacting dipentene-maleic anhydride with ethyl alcohol.

17. The method of producing a resinous material which includes reacting dipentene-maleic anhydride with a mixture of alcohols.

18. The method of producing a resinous material which includes reacting dipentene-maleic anhydride with a mixture of a monohydric alcohol and a polyhydric alcohol.

IRVIN W. HUMPHREY.